(12) United States Patent
Liu et al.

(10) Patent No.: US 10,038,367 B2
(45) Date of Patent: Jul. 31, 2018

(54) CONTROL OF AN ELECTRICAL CONVERTER

(71) Applicant: ROLLS-ROYCE plc, London (GB)

(72) Inventors: Xiong Liu, Singapore (SG); Michael A. Zagrodnik, Singapore (SG); Amit K. Gupta, Singapore (SG)

(73) Assignee: ROLLS-ROYCE plc, London (GB)

(*) Notice: Subject to any disclaimer, the term of this patent is extended or adjusted under 35 U.S.C. 154(b) by 0 days.

(21) Appl. No.: 15/601,050

(22) Filed: May 22, 2017

(65) Prior Publication Data

US 2017/0366082 A1 Dec. 21, 2017

(30) Foreign Application Priority Data

Jun. 15, 2016 (GB) .................................. 1610369.9

(51) Int. Cl.
  *H02M 1/42* (2007.01)
  *H02M 7/04* (2006.01)
  (Continued)

(52) U.S. Cl.
  CPC ....... *H02M 1/4233* (2013.01); *H02M 1/4216* (2013.01); *H02M 5/4585* (2013.01);
  (Continued)

(58) Field of Classification Search
  CPC .... H02M 1/32; H02M 5/4585; H02M 7/1557; H02M 7/49; H02M 7/66; H02M 7/84; H02M 2001/4283; H02M 2001/325
  See application file for complete search history.

(56) References Cited

U.S. PATENT DOCUMENTS

| | | | | |
|---|---|---|---|---|
| 4,879,639 A | * | 11/1989 | Tsukahara | H02M 5/4585 318/803 |
| 6,014,323 A | * | 1/2000 | Aiello | H02M 5/271 323/361 |

(Continued)

FOREIGN PATENT DOCUMENTS

DE     100 42 938 A1     3/2001

OTHER PUBLICATIONS

Guruvendrakumar et al. "A High Power Density Single-Phase PWM Rectifier With Active Ripple Energy Storage", International Journal of Research in Engineering & Advanced Technology, vol. 1, Issue 1, Mar. 2013.

(Continued)

*Primary Examiner* — Yusef A Ahmed
(74) *Attorney, Agent, or Firm* — Oliff PLC

(57) ABSTRACT

An electrical system including a three phase AC input supply and three or more H-bridge converter cells. Each H-bridge converter cell has: an active front end rectifier for receiving the three phase AC input supply and transforming it into a DC supply, thereby providing a rectifier current $i_i$; a capacitor suitable to receive a capacitor current $i_C$, the capacitor smoothing the DC supply; and an inverter suitable to receive an inverter current $i_o$, wherein $i_o = i_i - i_C$, said inverter transforming the received inverter current $i_o$ into a single phase AC supply. The system also including a control subsystem, which provides a signal to each active front end rectifier to vary its respective rectifier current $i_i$ such that the difference between the rectifier current $i_i$, provided by the active front end rectifier, and the inverter current $i_o$, received by the inverter, is substantially zero.

11 Claims, 8 Drawing Sheets

(51) Int. Cl.
  *H02P 7/03* (2016.01)
  *H02M 7/66* (2006.01)
  *H02M 7/84* (2006.01)
  *H02M 5/458* (2006.01)
  *H02M 7/49* (2007.01)

(52) U.S. Cl.
  CPC ............... *H02M 7/49* (2013.01); *H02M 7/66* (2013.01); *H02M 7/84* (2013.01); *H02P 7/04* (2016.02); *H02M 2001/4283* (2013.01)

(56) References Cited

U.S. PATENT DOCUMENTS

| | | | |
|---|---|---|---|
| 6,031,738 A | 2/2000 | Lipo et al. | |
| 6,301,130 B1 | 10/2001 | Aiello et al. | |
| 8,988,026 B2* | 3/2015 | Ahmed | H02M 5/4585 318/400.13 |
| 9,318,992 B2* | 4/2016 | Swamy | H02P 27/16 |
| 9,595,906 B2* | 3/2017 | Yamamoto | H02P 29/60 |
| 9,800,168 B2* | 10/2017 | Zou | H02M 5/458 |
| 2003/0214824 A1 | 11/2003 | Corzine | |
| 2003/0223251 A1* | 12/2003 | Hammond | H02M 5/4585 363/35 |
| 2006/0044848 A1* | 3/2006 | Suzuki | H02M 5/4585 363/37 |
| 2006/0113939 A1* | 6/2006 | Saren | H02M 5/458 318/434 |
| 2006/0274560 A1* | 12/2006 | Rastogi | H02M 5/458 363/131 |
| 2006/0279249 A1* | 12/2006 | Rastogi | H02M 5/458 318/807 |
| 2007/0182361 A1* | 8/2007 | Pande | H02P 1/029 318/812 |
| 2007/0211501 A1* | 9/2007 | Zargari | H02M 1/44 363/39 |
| 2008/0284367 A1* | 11/2008 | Kawashima | H02M 1/126 318/700 |
| 2009/0083553 A1* | 3/2009 | Buckey | H02M 7/49 713/300 |
| 2009/0102436 A1* | 4/2009 | Escobar Valderrama | H02J 3/1857 323/207 |
| 2009/0309524 A1* | 12/2009 | Rider | H02M 5/458 318/400.2 |
| 2010/0142234 A1* | 6/2010 | Abolhassani | H02M 5/4585 363/41 |
| 2011/0101897 A1* | 5/2011 | Wei | H02M 1/083 318/400.3 |
| 2011/0247900 A1* | 10/2011 | Blasko | B66B 1/302 187/247 |
| 2011/0299308 A1* | 12/2011 | Cheng | H02M 1/44 363/37 |
| 2012/0075892 A1* | 3/2012 | Tallam | H02M 1/12 363/37 |
| 2012/0181955 A1* | 7/2012 | Sodo | H02M 1/32 318/375 |
| 2012/0212982 A1* | 8/2012 | Wei | H02M 5/4585 363/37 |
| 2013/0100716 A1* | 4/2013 | Tong | H02M 1/32 363/37 |
| 2013/0121042 A1* | 5/2013 | Gan | H02M 7/49 363/37 |
| 2014/0042817 A1* | 2/2014 | Zargari | H02M 1/32 307/72 |
| 2014/0063870 A1* | 3/2014 | Bousfield, III | H02M 7/49 363/37 |
| 2015/0042253 A1* | 2/2015 | Yoo | H02P 23/0081 318/438 |
| 2015/0054443 A1* | 2/2015 | Swamy | H02P 27/16 318/504 |
| 2015/0171772 A1* | 6/2015 | Tallam | G01R 31/343 363/41 |
| 2015/0318791 A1* | 11/2015 | Baumann | H02M 5/458 318/504 |
| 2015/0365019 A1* | 12/2015 | Yamamoto | H02P 1/022 318/490 |
| 2015/0369852 A1* | 12/2015 | Mitsuda | H02M 5/458 324/550 |
| 2016/0285381 A1* | 9/2016 | Lai | H02M 5/458 |
| 2016/0308530 A1* | 10/2016 | Lee | H02M 1/08 |
| 2017/0047881 A1* | 2/2017 | Shimura | H02P 29/50 |
| 2017/0244314 A1* | 8/2017 | Lee | H02M 7/44 |
| 2017/0331389 A1* | 11/2017 | Ahmed | H02M 5/4585 |

OTHER PUBLICATIONS

Dec. 6, 2016 Search Report issued in British Patent Application No. 1610369.9.
Nov. 2, 2017 Search Report issued in European Patent Application No. 17 17 2121.

* cited by examiner

CONTROL OF AN ELECTRICAL CONVERTER

FIELD OF THE INVENTION

The present invention relates to the control of an active front end of an H-bridge converter. Particularly, but not exclusively, the present invention may relate to the application of load current feed-forward control of the active front end of a cascaded H-bridge converter.

BACKGROUND

Propulsion of marine vessels by electric drives is an increasing trend in the marine industry. For medium and small vessels, which have installed power of less than around 10 MW, the distribution voltage is expected to remain at 690V AC. For larger vessels however, the operating voltages are much higher, e.g. 3.3 kV or 6.6 kV, as these lead to significant advantages (better efficiency and less cables for example). Generally, these electric drives can be controlled through AC/AC converters such that the output AC waveform is adjustable. Some AC/AC converters are AC/DC-AC converters, so that the input AC waveform is converted to DC (via a DC-link) before being converter to the output AC waveform.

To achieve operation of these electric drives from a high voltage input, multilevel inverters are preferred. These inverters can be classified into three main categories: neutral point clamped (NPC) inverters; flying capacitor inverters, and cascaded multilevel inverters. For voltage levels higher than 3.3 kV, circuits using either NPC or flying capacitor inverters become increasingly complex. The split DC capacitors voltage balance control can also increase in complexity. The non-modularised design is another disadvantage of both the NPC and flying capacitor inverters since these systems have very low redundancy and any single component failure may lead to a whole system failure. The cascaded multilevel inverter do not suffer these deficiencies and has become a popular topology for voltage levels higher than 3.3 kV.

There are many advantages of a cascaded H-bridge (CHB) multilevel converter compared to, for example, a neutral point clamped (NPC) multilevel converter. These include a modularized design with high redundancy, a design which is easy to extend to higher voltages, a low $$\frac{dv}{dt},$$

an easy DC-link voltage balance control of modules etc. However, each cell of a CHB is a single-phase converter, where the instantaneous output power is not constant as it would be with a three-phase balanced NPC type converter. The power has $2^{nd}$ order load current frequency oscillation, which can lead to the requirement of a large DC-link capacitance to smooth out the DC-link voltage fluctuation. The large size DC-link capacitor bank results in a large and heavy CHB cell.

SUMMARY

In general terms, the invention provides a method of controlling an active front end rectifier in an H-bridge converter such that the current passing through a capacitor in the H-bridge converter is reduced.

Accordingly, in an aspect, the invention provides an electrical system including:
 a three phase AC input supply;
 three or more H-bridge converter cells, each H-bridge converter cell having:
  an active front end rectifier for receiving the three phase AC input supply and transforming it into a DC supply providing a rectifier current $i_i$,
  a capacitor suitable to receive a capacitor current $i_c$, the capacitor smoothing the DC supply, and
  an inverter suitable to receive an inverter current $i_o$, wherein $i_o = i_i - i_c$, said inverter transforming the received inverter current $i_o$ into a single phase AC supply; and
 a control subsystem, which provides a signal to each active front end rectifier to vary its respective rectifier current $i_i$ such that the difference between the rectifier current $i_i$, provided by the active front end rectifier, and the inverter current $i_o$, received by the inverter, is substantially zero.

Advantageously, this can minimise the value of $i_c$, which allows a capacitor of much smaller capacitance to be used in each H-bridge converter. Depending on the mode of operation, the H-bridge converters may be referred to as H-bridge inverters.

In another aspect, the invention provides a method of controlling an electrical system including a three phase AC input supply and three or more H-bridge converter cells, each H-bridge converter cell having an active front end rectifier, a capacitor, and an inverter, the method including:
 operating each H-bridge converter cell such that:
  each active front end rectifier receives a three-phase AC input supply and transforms it into a DC supply providing a respective rectifier current $i_i$;
  each capacitor receives a respective capacitor current $i_C$, the capacitor smoothing the DC supply, and
  each inverter receives a respective inverter current $i_o$, wherein $i_o = i_i - i_c$, the inverter transforming the received inverter current $i_o$ into a single phase AC supply; and
 providing a signal to the active front end rectifier of each H-bridge converter cell, the signal varying the rectifier current $i_i$ provided by the active front end rectifier such that the difference between the rectifier current $i_i$, and the inverter current $i_o$, is substantially zero.

In yet another aspect, the invention provides a marine propulsion system including an electric drive, said electric drive being powered by the electrical system according to the first aspect.

Each aspect of the invention may have any one or, to the extent that they are compatible, any combination of the following optional features.

The system may include more than three H-bridge converter cells, typically in such examples the number of H-bridge converter cells being a multiple of three.

The control subsystem may modify said signal based upon a feed-forward load current corresponding to the inverter current $i_o$. For example, the control subsystem may include one or more proportional-integral (PI) controllers. The, or each, PI controller may be supplemented by a respective resonant controller.

The system may further include a pulse width modulator for controlling an ON/OFF duration of switching devices within each active front end rectifier, the ON/OFF durations determining the respective rectifier current $i_i$, wherein the control subsystem provides the signal to each active front end rectifier by instructing the pulse width modulator to modify the ON/OFF durations.

The pulse width modulator may modify the ON/OFF durations by modifying duty ratios $d_a$ $d_b$ $d_c$ of the active front end rectifier, wherein the rectifier current $i_i$ is described by the equation:

$$i_i(t) = (d_a d_b d_c) \cdot \begin{pmatrix} i_u \\ i_v \\ i_w \end{pmatrix},$$

wherein $i_u$, $i_v$, and $i_w$ are components of the three phase AC input supply.

Each of the H-bridge converter cells may be a single phase H-bridge power cell in a respective cascaded H-bridge converter, each cascaded H-bridge converter may provide a single phase, and the outputs of the three or more cascaded H-bridge converters may connect to provide a three phase AC output supply.

Each cascaded H-bridge converter may be configured to operate as a multilevel cascade H-bridge converter.

Each H-bridge converter may further include an LCL filter positioned between its respective active front end rectifier and the three phase AC input supply.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
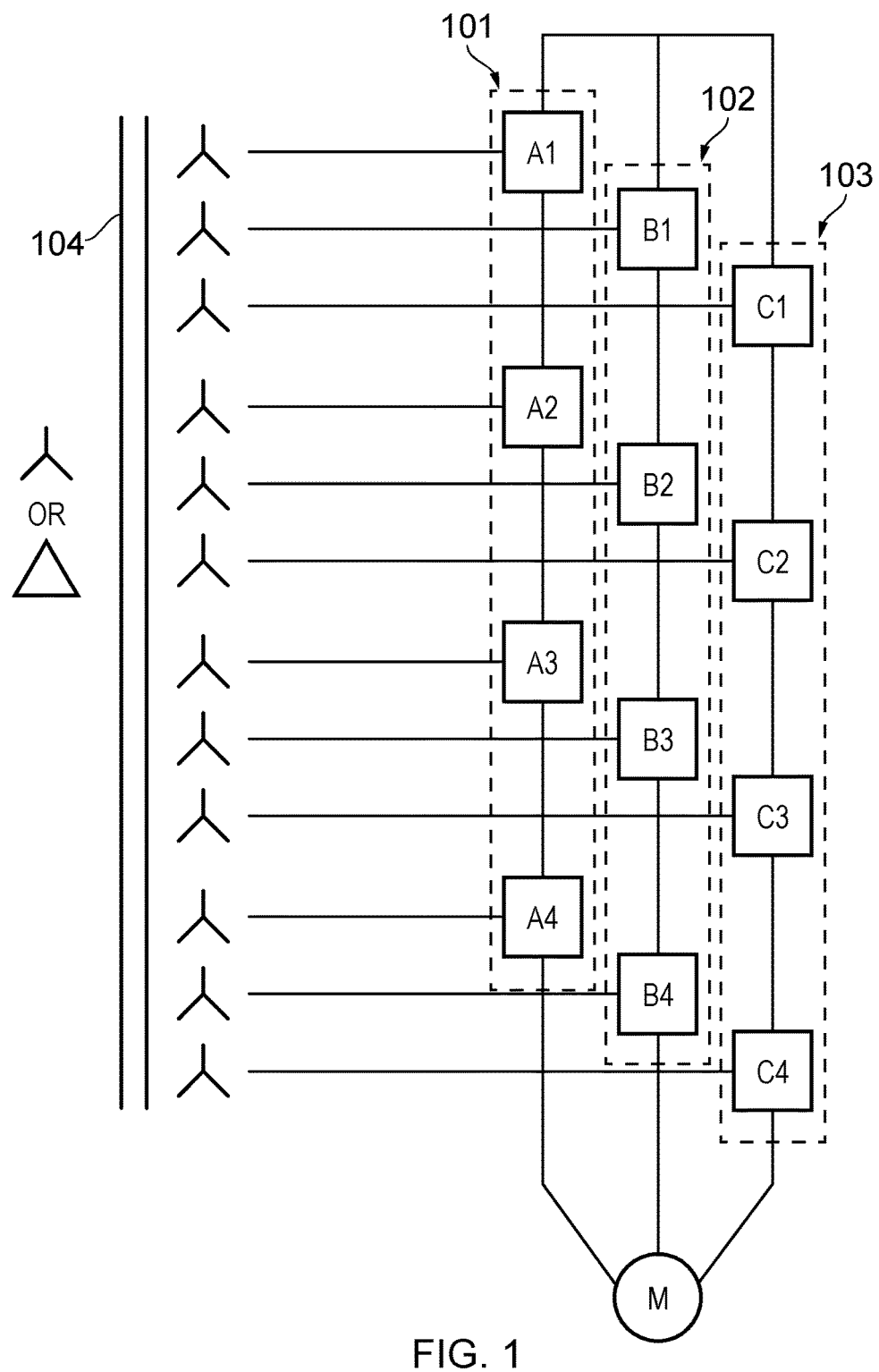
FIG. 1 shows a schematic view of a series of cascaded H-bridge converters.

As shown in FIG. 1, a cascaded H-bridge (CHB) multilevel converter is assembled from a number of single phase H-bridge power cells (or modules) e.g. A1-A4, which are cascaded together to form an equivalent single-phase voltage source. Three single-phase cascades 101, 102, 103 may be connected to a common neutral point M to form a three-phase voltage source. Any number of cells may be cascaded together. A CHB multilevel converter can facilitate the transformation from an input AC source of one waveform to an output AC source of a different waveform.

Figure 2A:
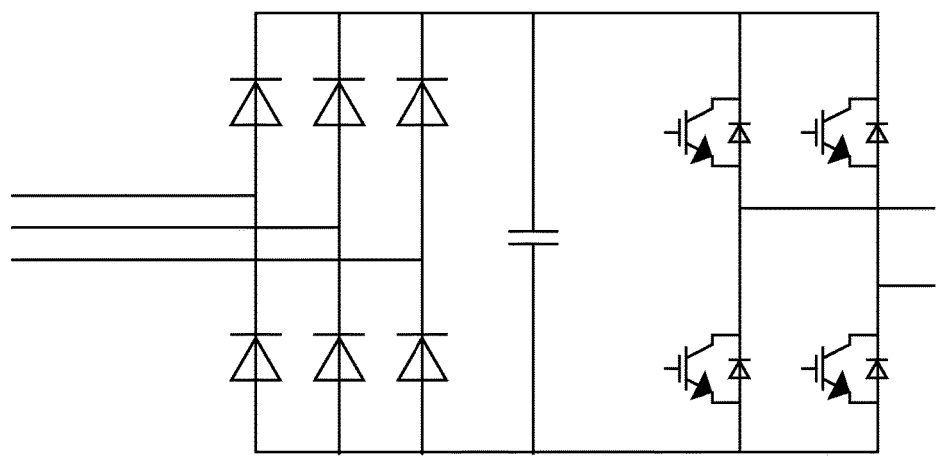
FIGS. 2A and 2B show variant arrangements for an H-bridge converter cell.

An isolated DC supply is required for each cell in a CHB multilevel converter. In high power drives, this DC supply can be obtained by a DC-link capacitor supported by a diode rectifier. There are many variations on this basic configuration. FIG. 1 shows an example of a CHB converter with 4 cells in series for each phase: A1-A4, B1-B4, and C1-C4. The transformer 104 has multiple isolated secondary windings to provide an isolated DC supply to each cell. If power regeneration is not required, diode front-end rectifiers can be used in each cell as is shown in the comparative example of FIG. 2A.

Figure 2B:
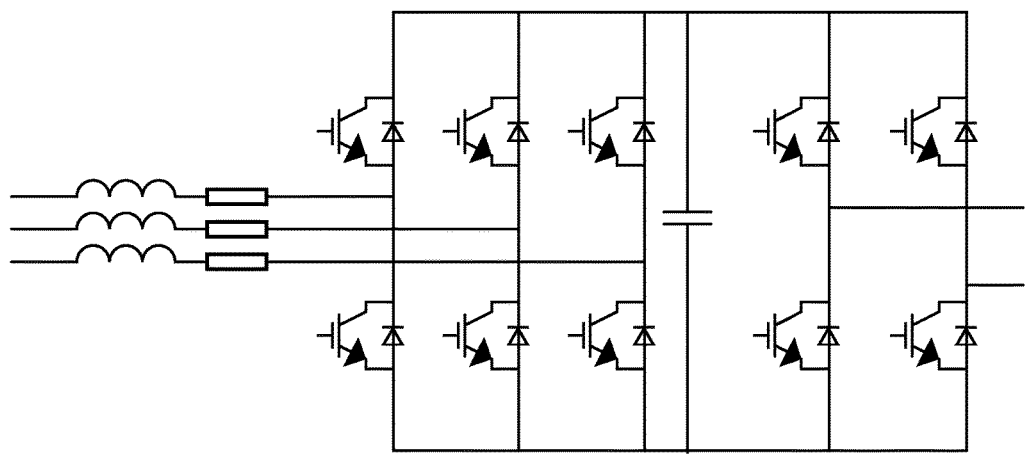

However, in a variation, which is illustrated in FIG. 2B, the DC-link capacitor voltage is regulated by an active front end (AFE) rectifier which allows real power to flow to the motor during motor operation, and to the grid during regeneration. Additional filters (either L or LCL filters) can be added if an AFE is used since leakage inductance may not be enough to filter the current switching harmonics. An H-bridge inverter cell can be realized in either 2-level, 3-level, or higher level topologies. The inverter shown in FIG. 2B is a 2-level inverter as it can provide voltage at V, 0, or -V. However, a further variant can be a 3-level inverter providing voltage at $$V, \frac{V}{2}, 0, -\frac{V}{2}, \text{ or } -V.$$

For power systems containing a single-phase inverter or rectifier, such as uninterruptible power supplies, grid connected single-phase inverters, or multilevel converters based on CHB cells, there exists a common issue of second-order oscillation of power in the DC-link. Large DC-link capacitance is required to smooth out the DC-link voltage fluctuation.

It is possible to reduce the DC capacitor size by using an active filter to absorb the second-order oscillation power in the DC-link. The principle is to divert the oscillation power from the DC-link to other energy-storing components such as a capacitor or inductor, which allows for much larger fluctuation in voltage or current. This can allow the DC capacitor size to be greatly reduced without adding any large capacitors or inductors.

Figure 3:
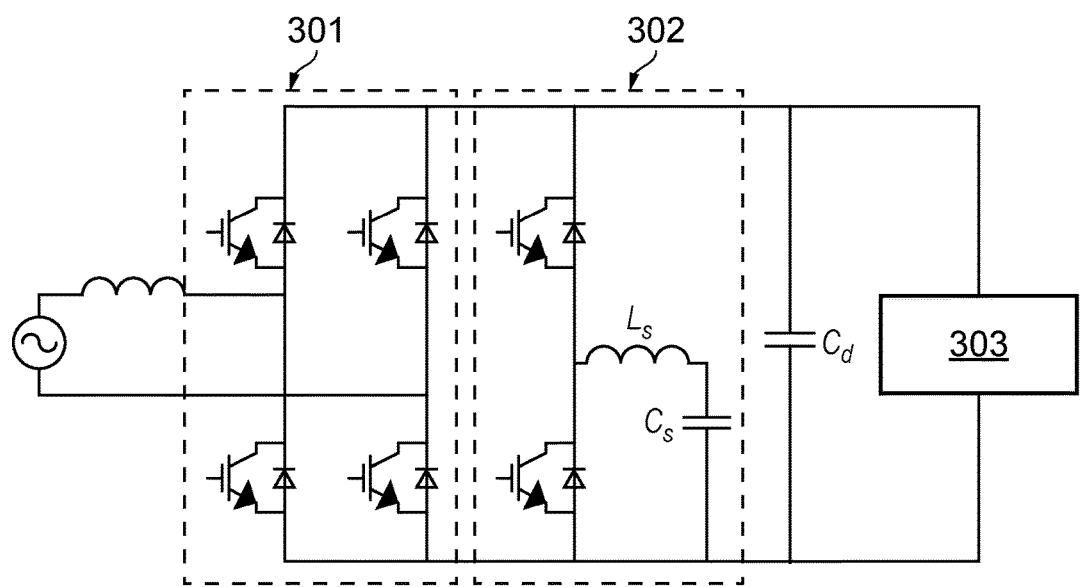
FIG. 3 shows an example of an active filter.

FIG. 3 shows a typical example of such an active filter 302 (see e.g. R. Wang, F. Wang, D. Boroyevich, and P. Ning, "A high power density single-phase PWM rectifier with active ripple energy storage," IEEE Trans. Power Electron., vol. 26, no. 5, pp. 1378-1383, May 2011, herein incorporated by reference). In FIG. 3, an AC source is connected to a single phase inverter/rectifier 301, which is then connected to the active filter 302. The filter 302 is then connected to a DC source or load 303. Through control of the active filter 302, the oscillation power in $C_d$ can be diverted to the capacitor $C_s$. The inductor $L_s$ and capacitor $C_s$ can be of relatively small size. When driven by a pulse width modulator (PWM), the H-bridge converter and active filter shown in FIG. 3 may be termed a single-phase pulse width modulation (PWM) converter, and this can be either an inverter or rectifier dependent on the DC side condition (e.g. whether it is a DC source or load). For a multilevel CHB inverter, the DC side source is from the front-end three-phase rectifier as shown in FIG. 1. The single-phase inverters in each leg are connected in series to drive the motor load.

Figure 4:
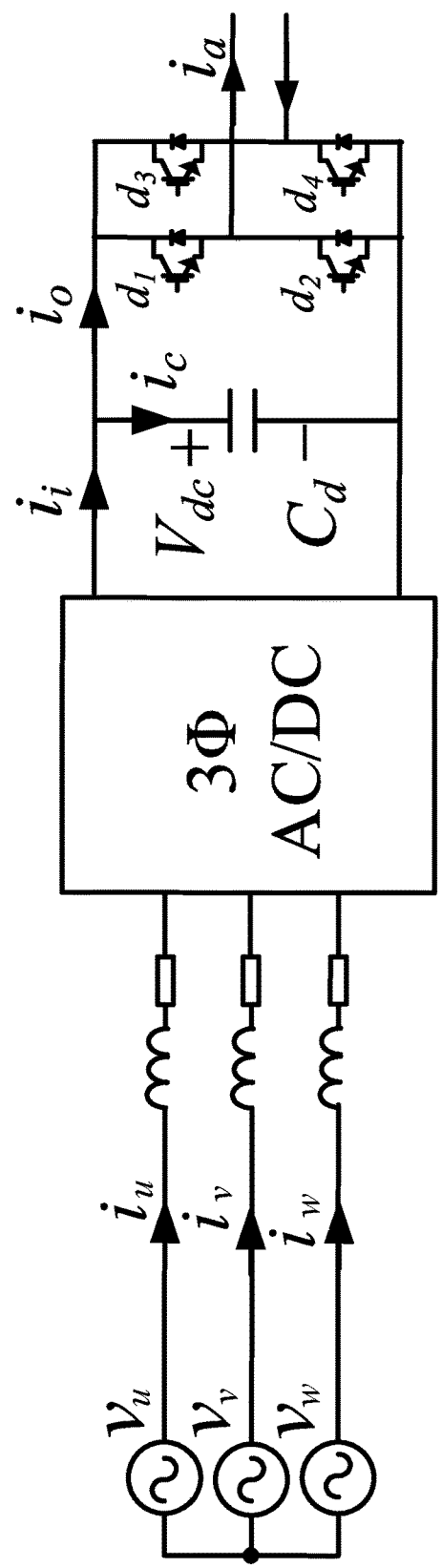
FIG. 4 shows an example of an H-bridge converter.

Although CHB converters have been widely used at voltage levels including 6.6 kV and above, a disadvantage of CHB converters is the unbalanced characteristic for each inverter cell. Each cell of a CHB is a single-phase inverter, where the instantaneous output power is not constant. The power has a $2^{nd}$ order load current frequency oscillation, which can require a large DC-link capacitance to smooth out the DC-link voltage fluctuations. A quantitative analysis for $2^{nd}$ order load current frequency oscillation and capacitor size is provided below based on the CHB cell circuit of FIG. 4.

The voltage fluctuation in the DC-link capacitor is caused by varying current flowing through the capacitor as expressed in equations (1) and (2). As discussed above, the three-phase AC/DC rectifier can either be diode front-end or PWM active front end. The capacitor current $i_C$ is determined by both the front-end rectifier current $i_i$ and the rear-end inverter current $i_o$ flowing through the DC-link.

$$v_{dc}(t) = \frac{1}{C_d} \int_0^\tau i_c(t)dt + V_{dc} \quad (1)$$

$$i_c(t) = i_i(t) - i_0(t) \quad (2)$$

For a diode-front end, the AC side three-phase currents contain negative sequence $5^{th}$ and $11^{th}$ order harmonics and positive sequence $7^{th}$ and $13^{th}$ order harmonics. The DC-link rectifier current $i_i$ contains $6^{th}$ and $12^{th}$ order source current frequency oscillation. In a steady state, the DC components of $i_i$ and $i_o$ are the same to maintain a constant average DC-link voltage $V_{dc}$. For an AFE, the current $i_i$ is subjected to the control strategy of the PWM converter as shown in (3).

$$i_i(t) = (d_A d_B d_C) \cdot \begin{pmatrix} i_u \\ i_v \\ i_w \end{pmatrix} \quad (3)$$

The average value of the single phase inverter DC-link current $i_o$ can be calculated using (4)-(7). Quantities $d_1$ and $d_3$ are duty ratios of the single-phase inverter upper switches, which can be calculated through modulation references, m is the modulation index, $\phi_0$ is the power factor angle of the inverter load, $\theta_a$ is the phase angle for the single-phase AC modulation reference signal, $i_a$ is the output current, and $I_{mo}$ is the output current amplitude.

$$i_0(t) = (d_1 - d_3)i_a(t) \quad (4)$$

$$d_1 = \frac{1 + m\cos(\omega_0 t + \theta_a)}{2}, \quad (5)$$

$$d_3 = \frac{1 + m\cos(\omega_0 t + \theta_a)}{2}$$

$$i_a(t) = I_{mo} \cdot \cos(\omega_0 t + \theta_a - \phi_0) \quad (6)$$

$$i_0(t) = (d_1 - d_3)i_a(t) = m\cos(\omega_0 t + \theta_a) \cdot I_{mo} \cdot \quad (7)$$
$$\cos(\omega_0 t + \theta_a - \phi_0)$$
$$= \underbrace{\frac{1}{2} m I_{mo} \cdot \cos\phi_0}_{\text{DC quantity}} + \underbrace{\frac{1}{2} m I_{mo} \cdot \cos(2\omega_0 t + 2\theta_a - \phi_0)}_{\text{AC quantity}}$$

The current $i_o$ contains both DC and AC quantities, as is shown in (7). The AC quantity can cause the DC-link voltage to fluctuate. Moreover, the DC voltage variations are inversely proportional to the frequencies of the AC currents as shown in (8).

$$\tilde{V}_{dc} = \frac{1}{2\omega_0 C_d} \cdot i_{oAC} \quad (8)$$

It should be noted that the DC voltage variation in (8) considers only the single-phase inverter effect. If a diode front-end rectifier was used, there will be $6^{th}$ and $12^{th}$ order source frequency currents in $i_i$. However, when an active PWM rectifier is used, the current $i_i$ is determined by the control strategy and may also contain an AC quantity. The AC current in $i_i$ can also cause DC-link voltage fluctuations. The final DC voltage variation will be superposition of the effects caused by both $i_i$ and $i_o$.

Whilst a large size DC-link capacitor can be used to reduce the DC voltage variation, it makes the CHB cell bulky. Further, a multilevel CHB inverter contains many cells. Additional legs and LC filters are required in each cell to construct an active filter suitable to mitigate the second order power in each CHB cell. Moreover, the active filter needs to be controlled properly. This requires hardware modification over the traditional systems and adds control complexity which may be undesirable.

Preferably, the amplitude of the DC-link capacitor AC current $i_c$ should attain its minimum value, in order to ensure a relatively stable DC-link voltage $V_{dc}$ with a small sized capacitor $C_d$. To achieve this objective, both the AC and DC components of the rectifier current $i_i$ and inverter current $i_o$ can be the same or as similar as possible. Moreover, the rectifier current should be controllable, and therefore an AFE rectifier is used. The AC and DC side voltage and current relations of an AFE rectifier can be described in (9) based on the power balance theory (when ignoring converter losses) where $i_{sd}$ is the d-axis current which represents the three-phase AC input current when considered under a direct-quadrature transformation, and $V_{sm}$ is the corresponding input phase voltage amplitude:

$$\frac{3}{2} V_{sm} i_{sd} = i_i(t) \cdot V_{dc} \quad (9)$$

Substituting the inverter current $i_o$ from (7) into the rectifier $i_i$ in (9):

$$i_{sd} = \frac{2V_{dc}}{3V_{sm}} \cdot \left(\frac{1}{2} m I_{mo} \cdot \cos\phi_0 + \frac{1}{2} m I_{mo} \cdot \cos(2\omega_0 t + 2\theta - \phi_0)\right) \quad (10)$$
$$= K(\cos\phi_0 + \cos(2\omega_0 t + 2\theta_a - \phi_0)),$$

$$K = \frac{m \cdot V_{dc} \cdot I_{mo}}{3 V_{sm}}$$

The AC side d-axis current can be calculated based on (10), and contains a DC quantity plus a $2^{nd}$ order load frequency $2\omega_0$ AC quantity. The q-axis current can be considered to be zero for unity power factor control. A well designed close-loop current controller can track the variable d-axis current reference.

The three-phase input currents $i_u$, $i_v$, and $i_w$ in a stationary reference frame can be calculated by (11):

$$i_u = i_{sd} \cdot \cos(\omega_i t + \theta_u) \quad (11)$$
$$i_v = i_{sd} \cdot \cos(\omega_i t + \theta_v)$$
$$i_w = i_{sd} \cdot \cos(\omega_i t + \theta_w)$$
$$\theta_v = \theta_u - \frac{2\pi}{3},$$
$$\theta_w = \theta_u + \frac{2\pi}{3}$$

By substituting the d-axis current $i_{sd}$ in (10) the phase current can be determined:

$$i_u = K(\cos\phi_0 + \cos(2\omega_0 t + 2\theta_a - \phi_0)) \cdot \cos(\omega_i t + \theta_u), \quad (12)$$

$$K = \frac{m \cdot V_{dc} \cdot I_{mo}}{3 V_{sm}}$$

It can been seen that the CHB cell phase current (corresponding to the transformer secondary winding current) has a cross-coupling effect between two frequencies: $2\omega_0$ and $\omega_i$, which makes the waveform non-sinusoidal. The input source current (corresponding to the transformer primary winding current) is the summation of multiple secondary winding currents from the same phase. Considering one cell from each leg, i.e. cells A1, B1, and C1 of FIG. 1, the primary phase current $i_{sAp}$ can be calculated as:

$$i_{sAp} = i_{uA1} + i_{uB1} + i_{uC1} \quad (13)$$

Where $i_{uA1}$ is the input current of phase u into the A1 cell, $i_{uB1}$ is the input current of phase u into the B1 cell, and $i_{uC1}$ is the input current of phase u into the C1 cell. The above equation assumes that the transformer is not a phase shifted type transformer, which is typical when using a rectifier with an AFE. The currents $i_{uA1}$, $i_{uB1}$, and $i_{uC1}$ are input phase currents from cells A1, B2, and C1 respectively:

$$\begin{aligned} i_{uA1} &= K(\cos\phi_0 + \cos(2\omega_0 t + 2\theta_a - \phi_0)) \cdot \cos(\omega_i t + \theta_u) \\ i_{uB1} &= K(\cos\phi_0 + \cos(2\omega_0 t + 2\theta_b - \phi_0)) \cdot \cos(\omega_i t + \theta_u) \\ i_{uC1} &= K(\cos\phi_0 + \cos(2\omega_0 t + 2\theta_c - \phi_0)) \cdot \cos(\omega_i t + \theta_u) \\ \theta_b &= \theta_a - \frac{2\pi}{3}, \\ \theta_c &= \theta_a + \frac{2\pi}{3} \end{aligned} \quad (14)$$

$$\cos(2\omega_0 t + 2\theta_a - \phi_0) + \cos(2\omega_0 t + 2\theta_b - \phi_0) + \cos(2\omega_0 t + 2\theta_c - \phi_0) = 0 \quad (15)$$

By substituting (14) and (15) into (13), the transformer primary current can be calculated:

$$i_{sAp} = 3K \cos\phi_0 \cdot \cos(\omega_i t + \theta_u) \quad (16)$$

As is evident from (16), the source current is sinusoidal and the cross-coupling effect between the two frequencies $2\omega_0$ and $\omega_i$ is cancelled among the three legs. The same conclusion can be drawn from cells $A_n$, $B_n$, and $C_n$ (where n≥2). The transformer secondary side currents will be controlled to be non-sinusoidal, but the primary side currents can be guaranteed sinusoidal as shown above.

Figure 5:
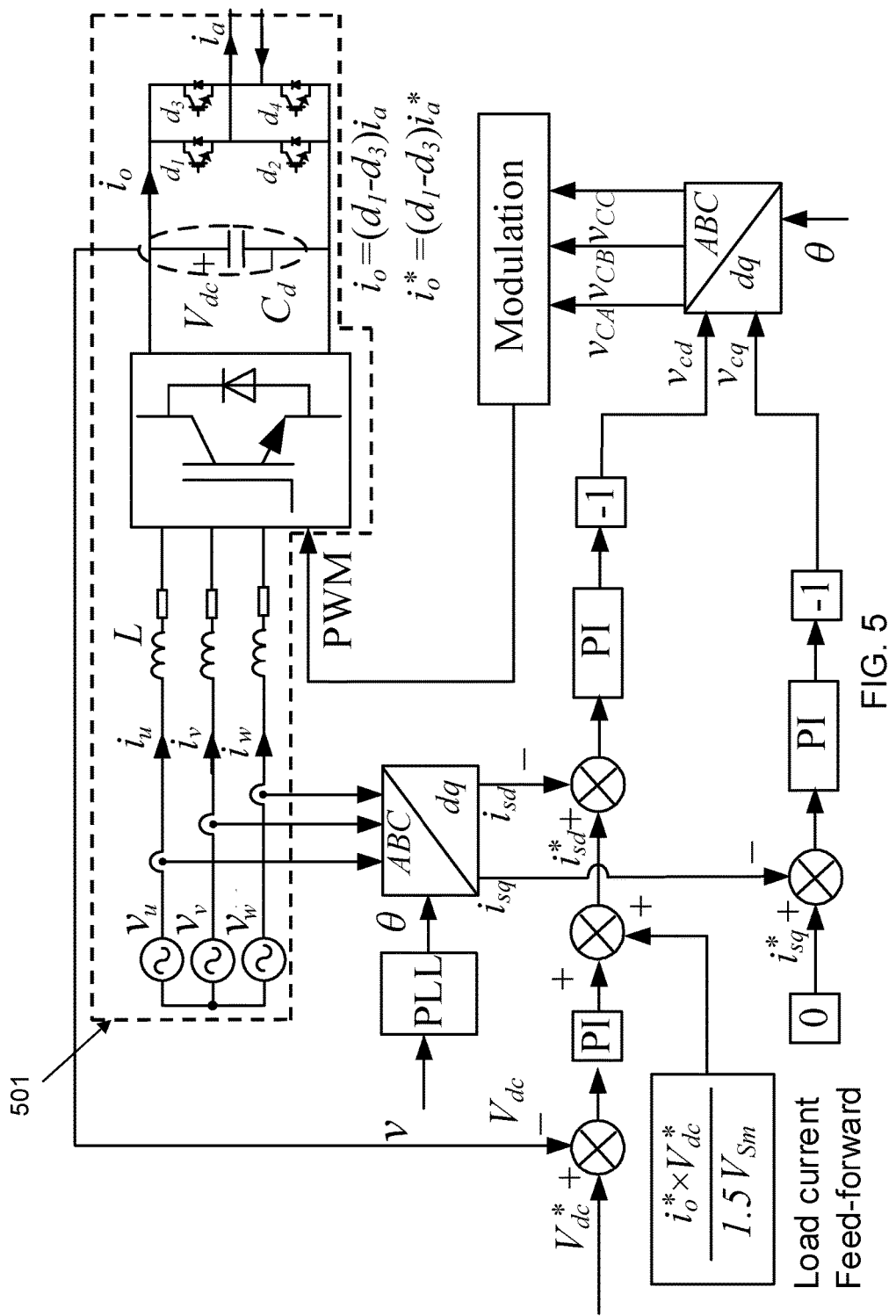
FIG. 5 shows a method of controlling a CHB cell.

Based on this principle, a control strategy is proposed for controlling the AFE rectifier of each CHB cell 501 as shown in FIG. 5. The input angle θ can be obtained from the primary side and calculated by a phase-locked loop controller, and the value is shared among each of the CHB cells. Each cell has its own DC-link voltage close loop control. The voltage control output plus the feed-forward control item are set as the d-axis current reference. The majority contribution of the current reference is from the feed-forward item, where the contribution from the voltage control output is to cover the system loss and calculation error. The q-axis current can be set to be 0 for unity power factor control, or it can be set to a certain value for reactive power compensation. The single-phase inverters of the same leg have the same current. To calculate the inverter DC average current $i_o$, either the measured phase current $i_a$ or the current reference $i*_a$ can be used. The current reference can be obtained from the motor drive control.

In the proposed control strategy, the difference between the desired DC-link voltage $V*_{dc}$ and measured DC-link voltage $V_{dc}$ is determined, and passed to a proportional-integral (PI) controller. The output from the PI controller is then added to the load current-feed forward value:

$$\frac{i_0^* \times V_{dc}^*}{1.5 V_{Sm}},$$

producing $i*_{sd}$, the reference d-axis current. The difference between the reference d-axis current $i*_{sd}$ and the measured d-axis current $i_{sd}$ is then determined, and the value passed to another PI controller. The output of the PI controller is used to modulate the pulse wave modulation signal which is sent to the AFE of the CHB cell 501. This signal controls the operation of the AFE, such that the rectifier current $i_i$ is varied.

Advantageously, by controlling the AFE rectifier as discussed above, the $2^{nd}$ order load current ripple will not flow into the capacitor. Therefore as this will not cause capacitor voltage variation, the capacitor size can be greatly reduced. Further, whilst the transformer secondary side currents will be controlled to be non-sinusoidal, the primary side currents can be guaranteed to be sinusoidal. As a result of the decrease in capacitor size, each CHB cell can be designed to have a much smaller volume and weight whilst not requiring any additional hardware components.

A variant arrangement for the control can be implemented by adding a resonant controller to the inner current loop. It is known that the d-axis current reference contains a DC quantity plus a $2^{nd}$ order load frequency $2\omega_0$ AC quantity. The PI controller can ensure that the fundamental positive sequence components track the DC command since it can provide infinite gain for the DC component. The current loop bandwidth may be set to around $\frac{1}{10}^{th}$ of the switching frequency to ensure enough phase margins for stability. For example, if a 4 kHz switching/sampling frequency was used, a 400 Hz current loop bandwidth can be set. The $2^{nd}$ order load frequency $2\omega_0$ AC quantity is subject to the machine rotation speed. For a 60 Hz rated machine, the maximum frequency of the d-axis current is 120 Hz if one does not consider over speed operation with field weakening control. Even through the frequency is within the current loop bandwidth 400 Hz, the PI controller gain is not enough to achieve zero steady-state error.

Figure 6:
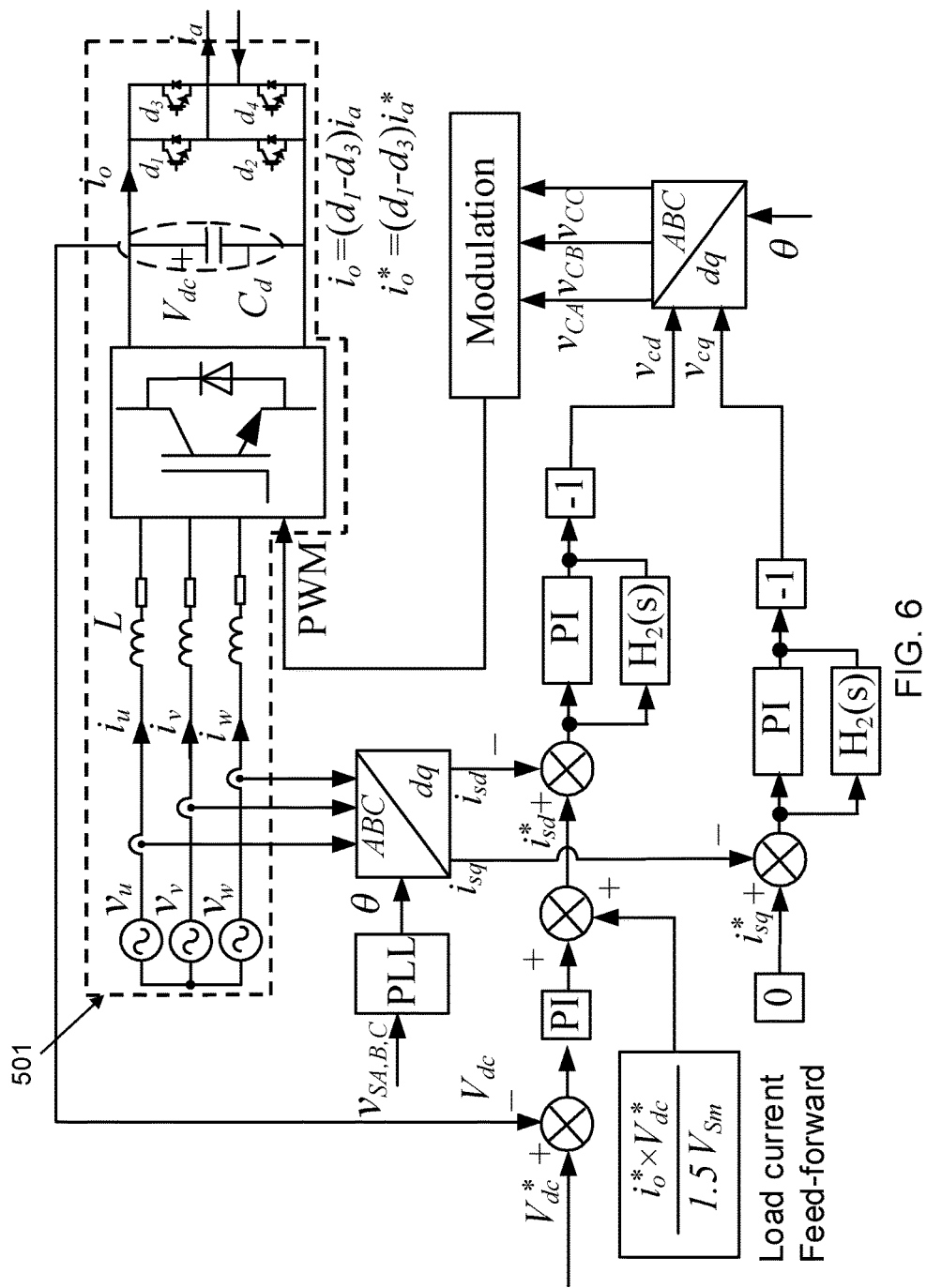
FIG. 6 shows a variant method of controlling a CHB cell.

To address this problem, a resonant controller can be added to the current loop as shown in FIG. 6. The frequency of the resonant controller $H_2(s)$ can be set as two times the synchronous frequency of the load machine:

$$H_2(s) = \frac{k_r s}{s^2 + 2\omega_c s + 4\omega_0^2} \quad (17)$$

Frequency of the resonant controller $2\omega_0$ is related to the machine synchronous speed, which can be tuned in use.

Figure 7:
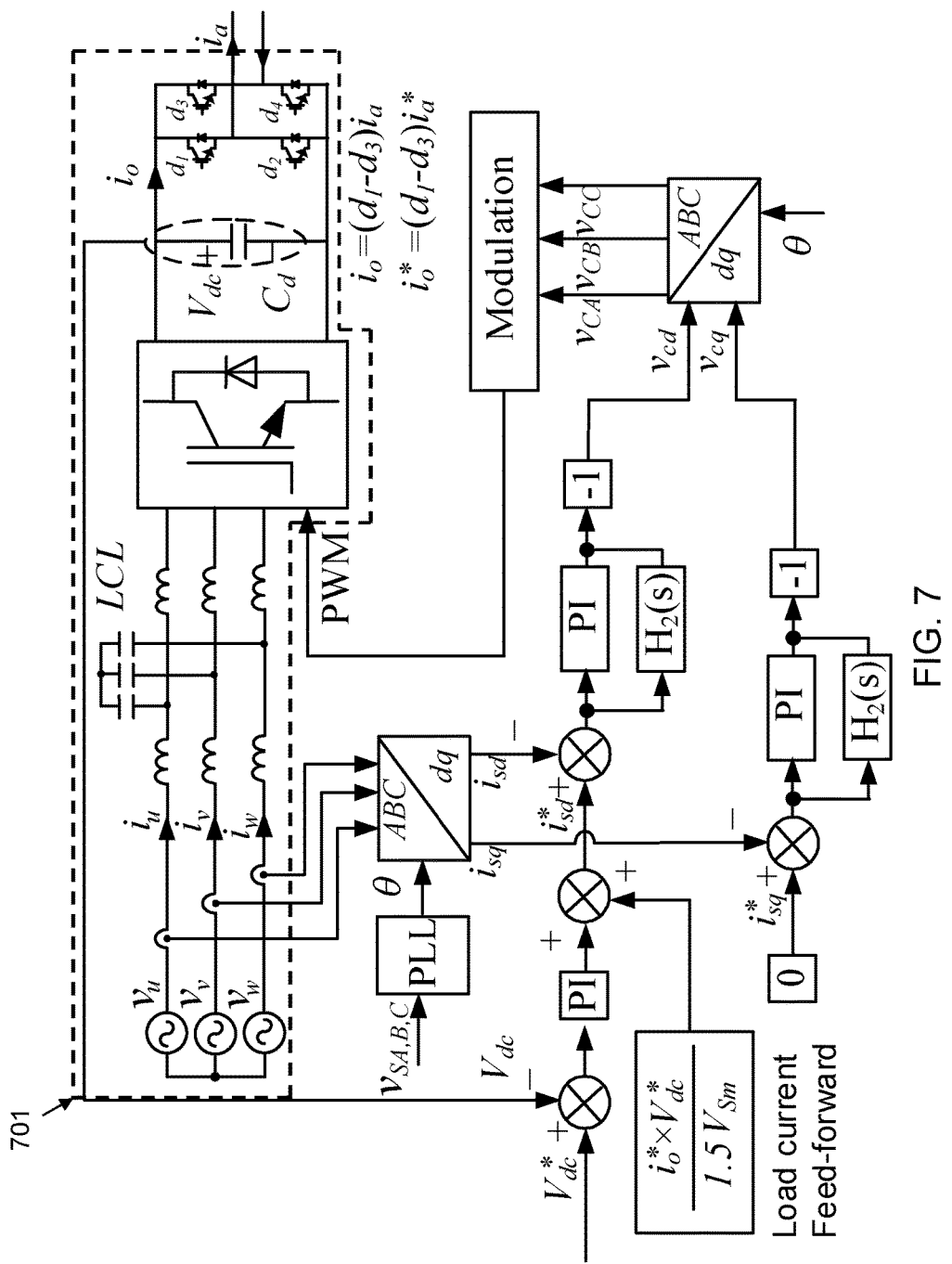
FIG. 7 shows a method of controlling a variant CHB cell.

As a further development, rather than limiting the AFE input filter to a first order inductor filter, an LCL filter can be used as shown in FIG. 7. This can reduce the filter size.

Figure 8:
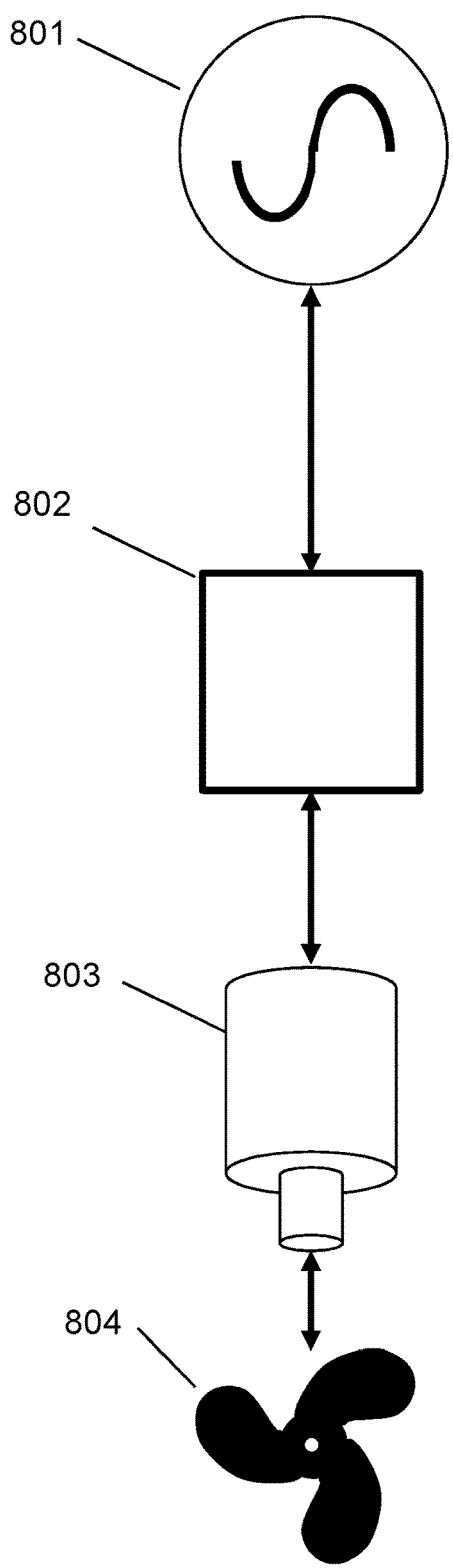
FIG. 8 shows a schematic of a marine propulsion engine including an electrical system.

FIG. 8 is a schematic of a marine propulsion drive including an electrical system as discussed above. A voltage source 801, which is preferably a three-phase AC supply of high voltage is connected to the electrical system 802. The electrical system 802, when acting as an AC/AC converter, receives the three-phase AC supply as an input and outputs an AC supply to an electric motor 803. The electric motor 803 is connected to a drive 804 e.g. propeller. The electrical system 802 controls the output waveform of the AC supply so as to enable the electric motor 803 to perform in the desired manner.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An electrical system including:
   a three phase AC input supply;
   three or more H-bridge converter cells, each H-bridge converter cell having:
      an active front end rectifier for receiving the three phase AC input supply and transforming it into a DC supply providing a rectifier current $i_i$,
      a capacitor suitable to receive a capacitor current $i_c$, the capacitor smoothing the DC supply, and
      an inverter suitable to receive an inverter current $i_o$, wherein $i_o = i_i - i_c$, said inverter transforming the received inverter current $i_o$ into a single phase AC supply; and
   a control subsystem, which provides a signal to each active front end rectifier to vary its respective rectifier current $i_i$ such that the difference between the rectifier current $i_i$, provided by the active front end rectifier, and the inverter current $i_o$, received by the inverter, is substantially zero,
   wherein the control subsystem modifies said signal based upon a feed-forward load current corresponding to the inverter current $i_o$, and a value of the feed-forward load current is calculated based on a desired DC-link voltage across the capacitor, the desired DC-link voltage being calculated, and not based on an actual DC-link voltage across the capacitor, the actual DC-link voltage being measured.

2. The electrical system of claim 1 further including a pulse width modulator for controlling an ON/OFF duration of switching devices within each active front end rectifier, the ON/OFF durations determining the respective rectifier current $i_i$, wherein the control subsystem provides the signal to each active front end rectifier by instructing the pulse width modulator to modify the ON/OFF durations.

3. The electrical system of claim 2, wherein the pulse width modulator modifies the ON/OFF durations by modifying duty ratios $d_a$ $d_b$ $d_c$ of the active front end rectifier, wherein the rectifier current $i_i$ is described by the equation:

$$i_i(t) = (d_a d_b d_c) \cdot \begin{pmatrix} i_u \\ i_v \\ i_w \end{pmatrix},$$

wherein $i_u$, $i_v$, and $i_w$ are components of the three phase AC input supply.

4. The electrical system of claim 1, wherein each of the H-bridge converter cells is a single phase H-bridge power cell in a respective cascaded H-bridge converter, each cascaded H-bridge converter providing a single phase, and wherein the outputs of said three or more cascaded H-bridge converters connect to provide a three phase AC output supply.

5. The electrical system of claim 4, wherein each cascaded H-bridge converter operates as a multilevel cascaded H-bridge converter.

6. A marine propulsion system including an electric drive, said electric drive being powered by the electrical system as set out in claim 1.

7. A method of controlling an electrical system including a three phase AC input supply and three or more H-bridge converter cells, each H-bridge converter cell having an active front end rectifier, a capacitor, and an inverter, the method including:
   operating each H-bridge converter cell such that:
      each active front end rectifier receives a three-phase AC input supply and transforms it into a DC supply providing a respective rectifier current $i_i$;
      each capacitor receives a respective capacitor current $i_c$, the capacitor smoothing the DC supply, and
      each inverter receives a respective inverter current $i_o$, wherein $i_o = i_i - i_c$, the inverter transforming the received inverter current $i_o$ into a single phase AC supply; and
   providing a signal to the active front end rectifier of each H-bridge converter cell, the signal varying the rectifier current $i_i$ provided by the active front end rectifier such that the difference between the rectifier current $i_i$, and the inverter current $i_o$, is substantially zero,
   wherein the signal is modified based upon a feed-forward load current corresponding to the inverter current $i_o$, and a value of the feed-forward load current is calculated based on a desired DC-link voltage across the capacitor, the desired DC-link voltage being calculated, and not based on an actual DC-link voltage across the capacitor, the actual DC-link voltage being measured.

8. The method of claim 7, wherein the electrical system further includes a pulse width modulator which controls an ON/OFF duration of switching devices within each active front end rectifier, the ON/OFF durations determining the respective rectifier current $i_i$, the signal instructing the pulse width modulator to modify the ON/OFF durations.

9. The method of claim 8, wherein the ON/OFF durations is modified by modifying duty ratios $d_a$ $d_b$ $d_c$ of the active front end rectifier, wherein the rectifier current $i_i$ is described by the equation:

$$i_i(t) = (d_a d_b d_c) \cdot \begin{pmatrix} i_u \\ i_v \\ i_w \end{pmatrix},$$

wherein $i_u$, $i_v$, and $i_w$ are components of the three phase AC input supply.

10. The method of claim 7, wherein each of the H-bridge converter cells is a single phase H-bridge power cell in a respective cascaded H-bridge converter, each cascaded H-bridge converter providing a single phase, and wherein the outputs of said three or more cascaded H-bridge converters connect to provide a three phase AC output supply.

11. The method of claim 10, wherein each cascaded H-bridge converter operates as a multilevel cascaded H-bridge converter.

* * * * *